(12) United States Patent
Monter et al.

(10) Patent No.: US 7,053,626 B2
(45) Date of Patent: May 30, 2006

(54) DEVICE AND METHOD FOR MONITORING THE CONNECTION OF AN ELECTRICAL SUPPLY UNIT

(75) Inventors: Leo Monter, Brombachtal (DE); Viktor Barinberg, Erbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/486,813

(22) PCT Filed: Aug. 14, 2002

(86) PCT No.: PCT/DE02/03018

§ 371 (c)(1),
(2), (4) Date: Jun. 10, 2004

(87) PCT Pub. No.: WO03/017460

PCT Pub. Date: Feb. 27, 2003

(65) Prior Publication Data

US 2005/0134288 A1    Jun. 23, 2005

(30) Foreign Application Priority Data

Aug. 14, 2001   (DE)   ................................ 101 39 860

(51) Int. Cl.
*G01R 31/08*   (2006.01)
*G01R 25/00*   (2006.01)
*G01R 31/36*   (2006.01)

(52) U.S. Cl. .................... 324/521; 324/76.78; 324/771

(58) Field of Classification Search ................ 324/521, 324/522, 538, 539, 546, 76.77, 76.78, 771, 324/772

See application file for complete search history.

(56) References Cited

U.S. PATENT DOCUMENTS

| 4,161,011 | A | * | 7/1979 | Wilkinson | .................... 361/80 |
| 5,617,018 | A | * | 4/1997 | Earle | .......................... 324/72.5 |
| 5,680,040 | A | * | 10/1997 | Kawai et al. | .................. 324/86 |
| 6,081,123 | A | * | 6/2000 | Kasbarian et al. | ........... 324/521 |
| 6,559,651 | B1 | * | 5/2003 | Crick | .......................... 324/522 |
| 6,885,166 | B1 | * | 4/2005 | Eisenhardt et al. | .......... 318/811 |
| 6,903,556 | B1 | * | 6/2005 | Sutton | ......................... 324/546 |

FOREIGN PATENT DOCUMENTS

| DE | 42 13 443 C1 | 1/1994 |
| DE | 100 35 783 A | 2/2001 |

* cited by examiner

*Primary Examiner*—Anjan Deb
*Assistant Examiner*—Jeff Natalini
(74) *Attorney, Agent, or Firm*—Michael J. Striker

(57) ABSTRACT

The invention relates to a device and a method for monitoring the connection of an electrical supply unit comprising voltage detection (32) detecting phase voltage (14), current detection (32) detecting phase voltages (38), a transformation unit (66) transforming the phase voltages (38) after conducting field-oriented regulation in at least one cross current (62), wherein a monitoring device (34) is provided to monitor at least one supply connection (28, 36) by means of which an electrical supply unit (32) is supplied, said monitoring unit evaluating the variation of the cross current (62) in order to monitor the connection.

12 Claims, 6 Drawing Sheets

DEVICE AND METHOD FOR MONITORING THE CONNECTION OF AN ELECTRICAL SUPPLY UNIT

BACKGROUND OF THE INVENTION

The invention is based on a device and a method for monitoring the connection of an electrical supply unit. From German Patent DE 42 13443 C1, a circuit arrangement for monitoring the failure of fuses is already known. The fuses are each connected into the current paths of a rotary current network for supplying a consumer. The circuit arrangement has a first delta-connection circuit for detecting the phase of a voltage between each two conductors of the rotary current network upstream of the fuses and a second delta circuit for detecting the phase of a voltage between each two conductors of the rotary current network downstream of the fuses. The respective phases upstream and downstream of the fuses are compared with one another, and a failure signal is output if a phase difference occurs, or if one or more phases are absent. This circuit is also suitable for monitoring the connection of an electrical supply unit.

The object of the invention is to disclose a device for monitoring the connection which in particular reduces the requisite hardware expense for that purpose. This object is attained by the characteristics of the independent claim.

SUMMARY OF THE INVENTION

The device according to the invention for monitoring the connection of an electrical supply unit has a voltage detector, which ascertains the phase voltages. A current detector is also provided for detecting the phase currents. A transformation unit converts the phase currents, on the theory of field-oriented regulation, into at least one transverse current. According to the invention, for monitoring at least one supply connection, by way of which an electrical supply unit is supplied, a monitoring device is provided, which evaluates the course of the transverse current for monitoring the connection, and in particular in servo drives, recourse is had to field-oriented regulation. In the course of the field-oriented regulation, the requisite coordinate transformations of the phase variables into transverse and longitudinal variables are performed. The transverse current, in particular, is thus already available in field-oriented regulation. According to the invention, this transverse current is now evaluated for the purpose of monitoring the connection. This is because it has been demonstrated that particularly the polarity of the transverse current during the activation course is an unambiguous indication whether the phase connections of the supply unit have been transposed. Only if connection is done correctly is the transverse current course always below a defined limit value, in this case I=0. In all other cases, conversely, in which the transverse current permanently or briefly assumes a positive value during the activation operation, it can be concluded that there is faulty connection wiring. This monitoring the connection can thus be done purely by software. Additional hardware is no longer needed. This makes the corresponding monitoring device less expensive.

In an expedient refinement, it is provided that the monitoring device, for monitoring the connection, ascertains the various phase powers from the phase voltages and phase currents and evaluates them. In particular the sign of the resultant powers can in turn be evaluated as an indication of whether phases have been transposed with one another and if so which phases and in which way. In the monitoring of a three-phase rotary current network for supplying the electrical supply unit, if there is only one positive phase power it can be concluded that the other two phases of negative power have been transposed. By including the phase-related powers, an unambiguous connection fault diagnosis can be achieved purely computationally without requiring additional hardware.

In an expedient refinement, it is provided that the monitoring device evaluates the longitudinal current for monitoring the connection. Particularly if all the phase-related powers are negative, the phase shift by either +120° or −120° can be detected unambiguously from the longitudinal current. By including the longitudinal current, all possible faulty connections can now be detected unambiguously. Since on the other hand the longitudinal current is already available in the context of field-oriented regulation, this evaluation assures low effort and expense for computation. Further expedient refinements will become apparent from the further dependent claims and from the description.

BRIEF DESCRIPTION OF THE DRAWINGS

One exemplary embodiment of the device of the invention is shown in the drawing and will be described in further detail below.

Shown are

DETAILED DESCRIPTION OF THE PREFERRED EMBODIMENTS

Figure 1A:
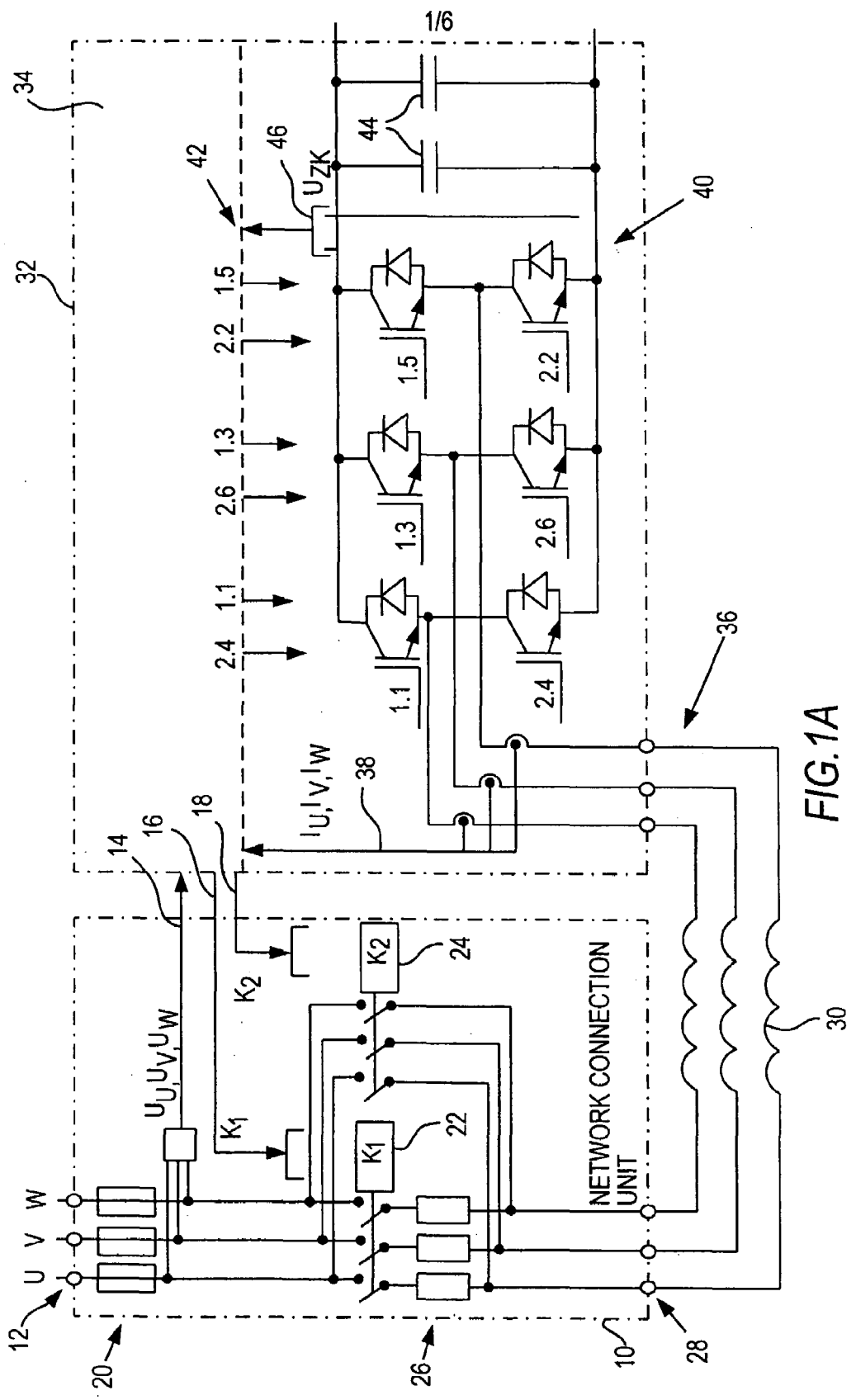
FIGS. 1a and 1b, the basic layout of the device for monitoring the connection.

Via a network connection 12, the three phases U, V, W of a rotary current network (360 to 510 V, 50/60 Hz) are supplied to a network connection unit 10. Each of the three phases U, V, W is protected via a fuse 20. Downstream of the fuses 20 in terms of the network, the phase voltages $U_U$, $U_V$, $U_W$ 14 are picked up and delivered to a regulation and control block 34 of a supply unit 32. This regulation and control block 34 furnishes a first and second protective trigger signal 16, 18 for triggering a charge contactor 22 and a network contactor 24, which is integrated with the network connection unit 10. If the charge contactor 22 is triggered by a suitable trigger signal 16 in the direction of closure, then the phase currents $I_U$, $I_V$, $I_W$, via charge resistors 26, reach the respective reactor connection points 28 in the form of outputs of the network connection unit 10. The charge resistors 26 are bridged by the network contactor 24, once the charging operation of the intermediate circuit capacitors 44 is ended. This is recognized by means of measuring the intermediate circuit voltage 46. For each of the phases U, V, W, commutation reactors 30 are now provided, which are to be connected to the three reactor connection points 28. The other connections of the commutation reactors 30 are connected to the reactor connections 36 of the supply unit 32. The phase currents $I_U$, $I_V$, $I_W$ delivered via these reactor connections 36 of the supply unit are detected in the supply unit 32 and delivered to the regulation and control block 34. Six power transistors of the end stage 40, wired as B6 bridge, form the DC converter or AC converter block of the supply unit 32. Each of the transistors is provided with an antiparallel-connected diode as a free-wheeling diode. The end stage 40 is connected by end stage trigger signals 42 from the regulation and control block 34, in order to convert the supplied three-phase alternating voltage, for supplying for instance an electrical drive mechanism, into a direct voltage. This direct voltage is available in a direct voltage intermediate circuit as an intermediate circuit voltage 46. For further smoothing of this voltage, intermediate circuit capacitors 44 are provided. The intermediate circuit voltage 46 applied to the intermediate circuit capacitors 44 is likewise delivered to the regulation and control block 34.

Figure 1B:
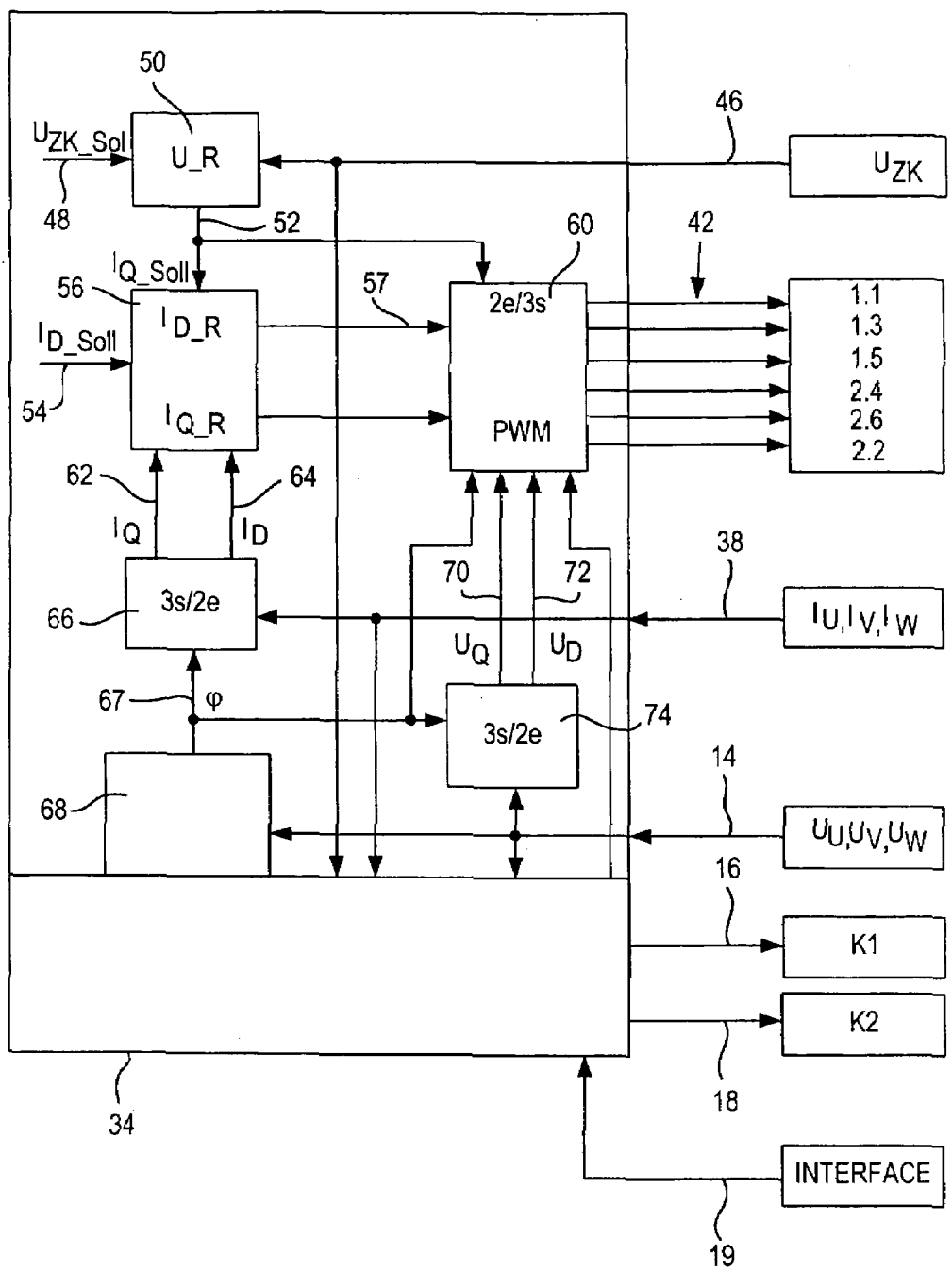

The regulation and control block 34 of the supply unit 32 is shown in further detail in FIG. 1*b*. A voltage regulator 50 disposed in the regulation and control block 34 receives as its input variables both an intermediate circuit voltage set-point value 48 and the intermediate circuit voltage 46 as an actual value. From them, the voltage regulator 50 ascertains a transverse current set-point 52, which is delivered as an input variable to both a current regulator 56 and a transformation and PWM conversion unit 60. The phase voltages $U_U$, $U_V$, $U_W$ 14 are delivered to both a voltage transformer 74 and a reference angle generator 68. From them, the reference angle generator 68 ascertains the phase angle 67, which in turn is supplied as an input variable to a current transformer 66 and the voltage transformer 74 as well as to the transformation and PWM conversion unit 60. From the phase currents $I_U$, $I_V$, $I_W$ 38 also supplied, the current transformer 66, on the principles of field-oriented regulation, generates both a transverse current actual value 62 and a longitudinal current actual value 64, which serve not only as a longitudinal current set-point value 64 but also serve the current regulator 56 as input variables. As output variables, the current regulator 56 makes both a transverse voltage set-point value 57 and a longitudinal voltage set-point value 59 available to the transformation and PWM conversion unit 60. The transformation and PWM conversion unit 60 is also supplied with a transverse voltage actual value 70 and a longitudinal voltage actual value 72, both of them generated by the voltage transformer 74. The transformation and PWM conversion unit 60 performs a back-transformation of the longitudinal and transverse components to the corresponding phase-related components and generates pulse-width modulated trigger signals for the six transistors of the end stage 40. External interface signals 19 are also delivered to the regulation and control block 34. The monitoring process for monitoring the connection that runs in the regulation and control block 32 is shown in FIG. 2.

Figure 3:
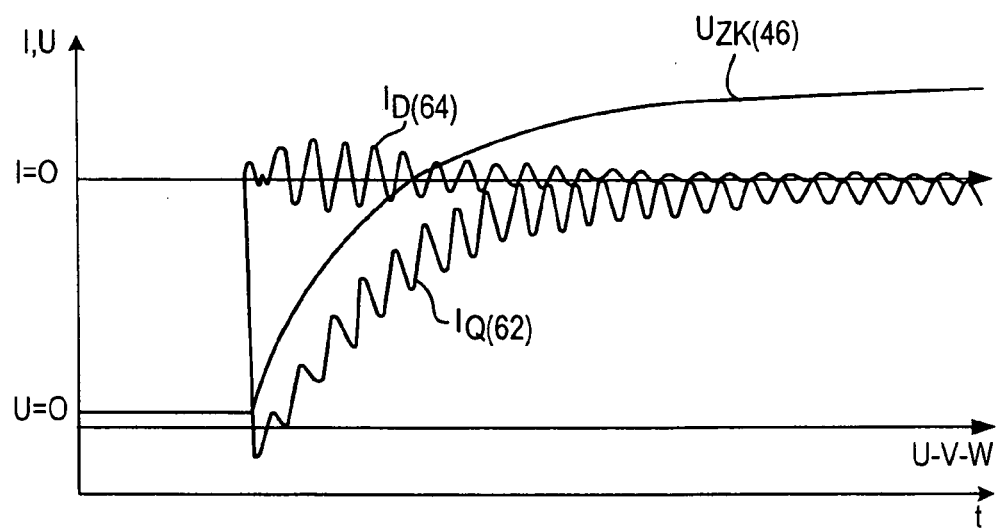
FIGS. 3 through 8, typical courses of the longitudinal current and transverse current with the associated intermediate circuit voltage, for different connections of the three phases of a rotary current network.
Figure 4:
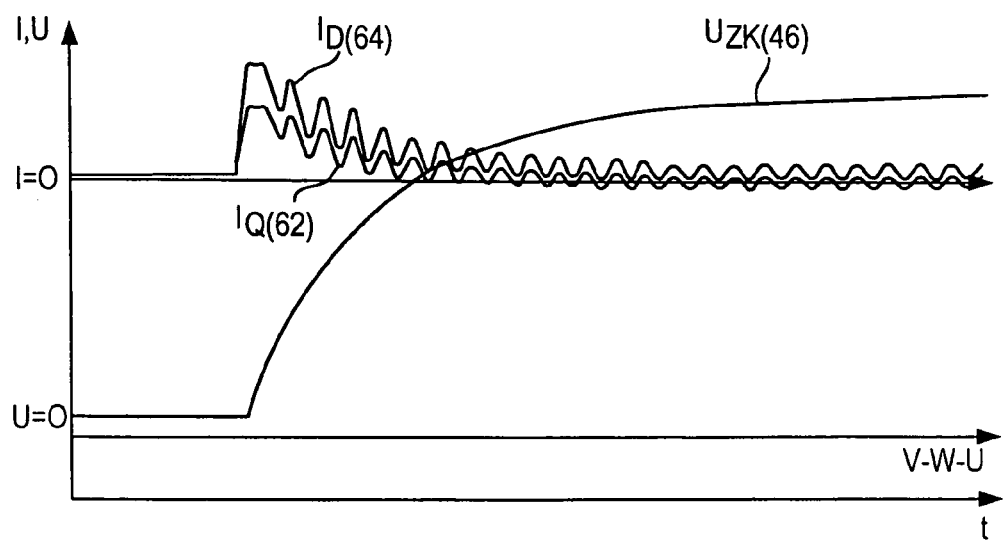
Figure 5:
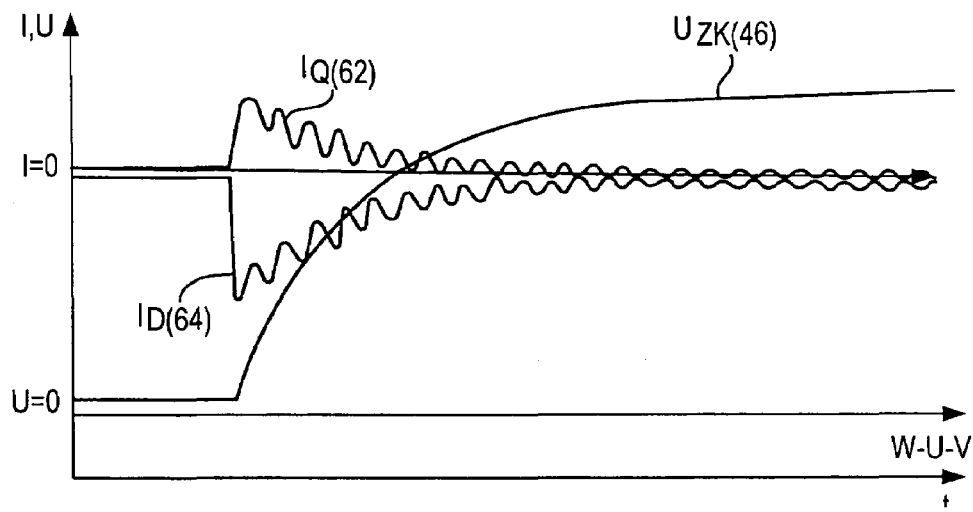
Figure 6:
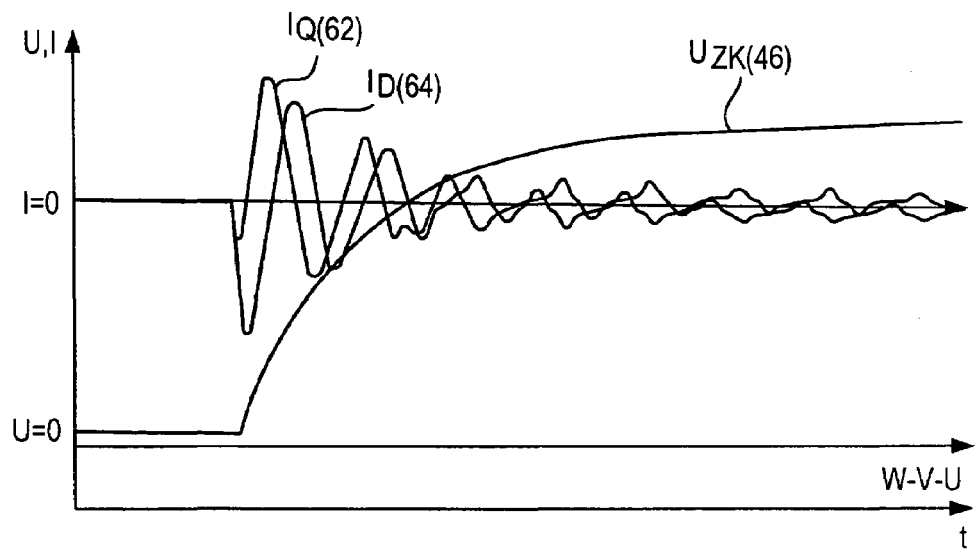
Figure 7:
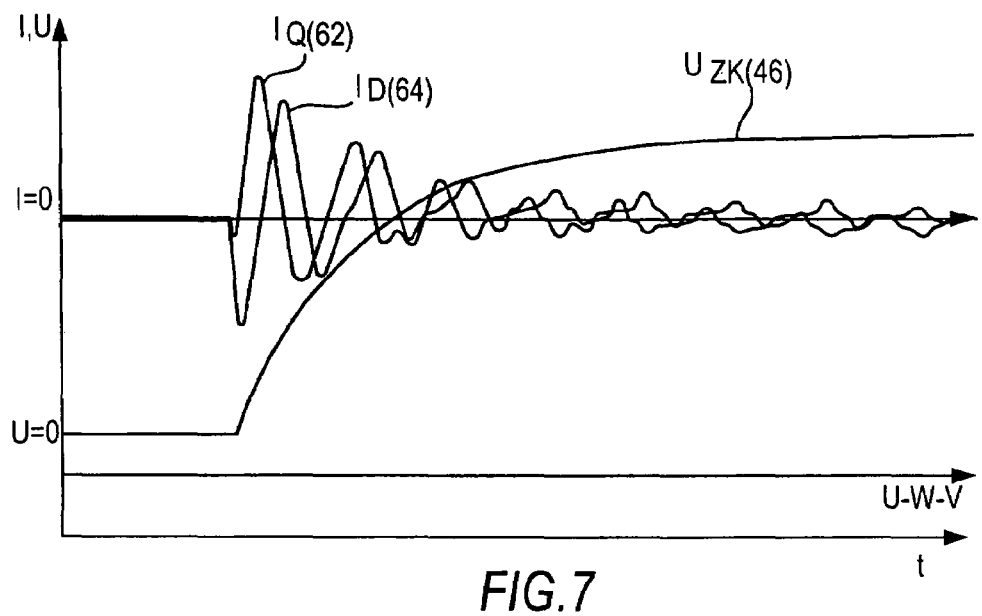
Figure 8:
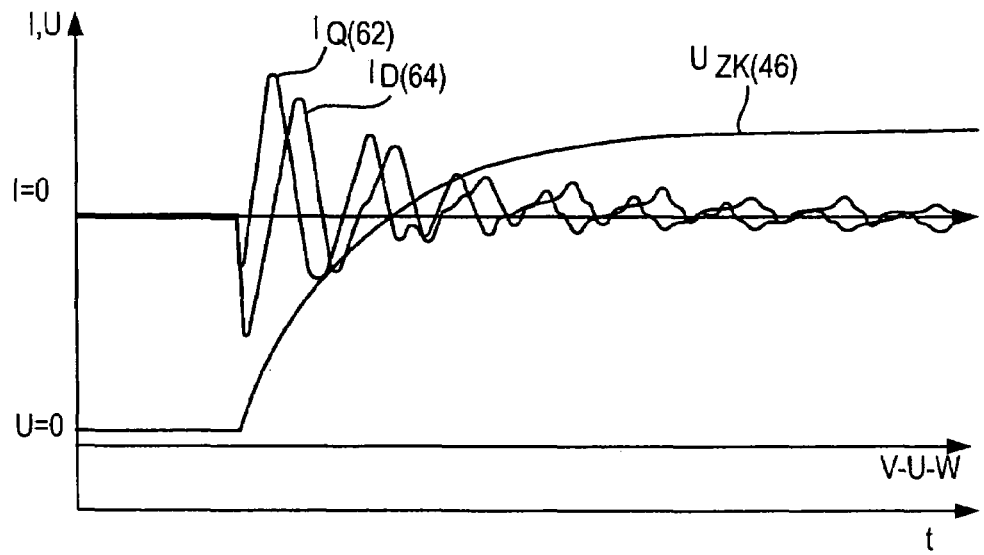

In FIG. 3, the courses of the transverse current (actual value) 62 and longitudinal current (actual value) 64 and of the intermediate circuit voltage 46 are shown as a function of time. The intermediate circuit voltage 46 rises at the instant of activation, with the course of an exponential function. At the same instant, the transverse current 62 abruptly drops and then rises with the course of an exponential function. However, the transverse current 62 always remains negative; that is, it never exceeds the value I=0. The longitudinal current 64 oscillates around the zero line. In FIG. 3, the courses of these variables with correct connection are shown. In FIG. 4, the phases U, V, W are cyclically offset by +120°; that is, they have been connected in the sequence V, W, U. Both the transverse current 62 and the longitudinal current 64 then always have positive values and approach the zero line. FIG. 5 shows an arrangement of the phases cyclically transposed by −120°: The order of connection is W, U, V. Once again, the transverse current 62 is only positive and oscillatingly approaches the value I=0. The longitudinal current 64, conversely, has only negative values, whose course likewise approaches the value of I=0. In FIG. 6, two phases have been transposed: Here the connection order is W, V, U. Both the transverse current 62 and the longitudinal current 64 oscillate about the zero line and reach both positive and negative values. This behavior can also be seen from FIGS. 7 and 8. In FIG. 7, the phases W and V have been transposed (connection order: U, V, W), while in FIG. 8 the phases V and U are transposed (connection order: V, U, W).

Figure 2:
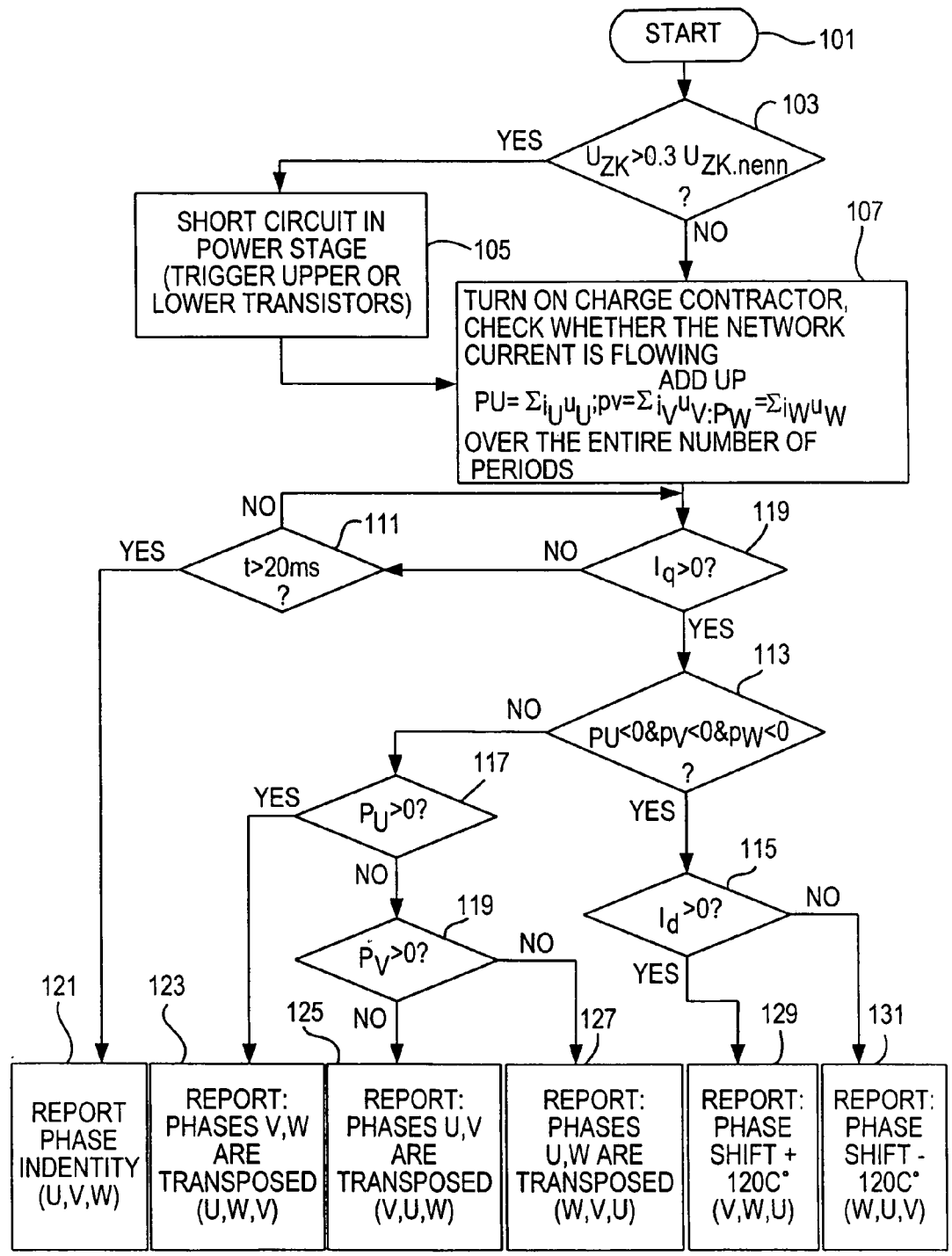
FIG. 2, the monitoring program that runs in the device for monitoring the connection.

These characteristic current courses are purposefully interrogated in the monitoring program of FIG. 2 for the sake of monitoring the connection.

The supply unit 32 is regulated in field- or network-oriented fashion. According to the theory of vector regulation, the detected phase current $I_U$, $I_V$, $I_W$, after transfer to a field-related orthogonal two-phase system (D-Q coordinate system), can be divided into two components, namely the transverse current 62 and the longitudinal current 64. The longitudinal current component 64 (reactive current component) builds up the supplied and fed back reactive power of the supply unit 32 and is normally set at the value zero. The transverse current 62 is perpendicular to the longitudinal current 64; it is oriented in the same direction as the network voltage and forms a standard for the effective power supplied.

The supply unit 32 can be triggered such that it rectifies the alternating voltage of the three-phase alternating voltage network into the intermediate circuit voltage 46 and with this energy from the network supplies an electrical consumer, not shown in detail, such as an inverter which in turn supplies an electric motor. For example, the supply unit 32 includes six controlled power transistors of the end stage 40, which are triggered in pulse width modulated fashion, for instance at a clock frequency of 8 kHz with a variable pulse width ratio.

Thus the current transformer 66, in the context of field-oriented regulation, already makes the transverse current actual value 62 and the longitudinal current actual value 64 available. According to the invention, now, among others these components are evaluated intentionally for detecting the network phase relationship. The three phases U, V, W of a rotary current network are delivered with the correct phase in the intended way to a network connection unit 10. The reactor connection points 28 should be connected correctly for each phase U, V, W to the reactor connections 36 of the supply unit via the commutation reactors 30. A correct connection is shown in FIG. 1*a*. However, there are also possible ways of transposing the network phase order compared to the network connection 12, as a result of incorrect connection. The result could be that the outputs of the network connection unit 10 for the phases U, V, W are not correctly connected to the phase-related connections of the supply unit 32. In correct operation, the phases U, V, W of the supply unit 32 should be supplied in the order U, V, W from left to right, as shown in FIG. 1*a*. Incorrect connections are detected by the monitoring method described in conjunction with FIG. 2.

For starting the supply unit 32, the charge contactor 22 should be triggered in the direction of closure via the external interface signal 19, so that the intermediate circuit capacitor 44 can be charged via the charge resistors 26, serving to limit current, and the free-wheeling diodes of the end stage 40. The network contactor 24 is opened. In an interrogation block 103, however, the regulation and control block 34 decides beforehand, by comparison of the intermediate circuit voltage 46 with a fixed limit value, which control mechanism will be chosen (step 105 or step 107).

For instance, if an intermediate circuit voltage 46 of less than 30% of the intermediate circuit voltage is detected (for example, the supply unit 32 was not yet connected to the network, and the intermediate circuit capacitors 44 are completely discharged), then the routine is started in step 107. Conversely, if an intermediate circuit voltage 46 greater than 30% of the intermediate circuit voltage is detected (for instance, the supply unit 32 was activated, and, the intermediate circuit capacitors 44 have not yet been completed discharged, or no load currents can flow after the charge contactor 22 has been turned on), then the routine is started in accordance with step 105, or all three upper transistors 1.1, 1.3, 1.5, or all three lower transistors 2.2, 2.4, 2.6, are triggered via the IGBT triggers 42. Thus via these transistors and charge resistors 26, an intentional short circuit is brought about for a length of time that is fixed in the regulation and control block 34, so that the short-circuit current in this case acts as a substitute charging current, which is what is to be monitored. This is again followed by step 107. In step 107, the charge contactor 22 is switched on, and the question is asked whether the network current 30 (charge current or short-circuit current) is flowing. For a predeterminable length of time, the current and voltage courses of the phase currents $I_U$, $I_V$, $I_W$ 38 and the phase voltages $U_U$, $U_V$, $U_W$ 14 are detected and stored, for instance in digitized form. From these phase-related current and voltage courses, the electrical power is now ascertained for each phase: $PU = \Sigma\, i_U{}^* u_U$; $p_V = \Sigma\, i_V{}^* u_V$; $p_W = \Sigma\, i_W{}^* u_W$, over an integral multiple of a period length. Moreover, in step 107, the course over time of the transverse current 62 and of the longitudinal current 64, for instance as it results as shown in FIGS. 3 through 8, is ascertained.

As the first criterion for whether a correct phase connection of the supply unit 32 exists, in the interrogation block 109 the transverse current 62 is compared with a limit value. If the course over time of the transverse current 62 within a time interval 20 ms—found out via the interrogation block 111—never exceeds the value I=0, then the conclusion is drawn that the phase connection is correct. A report is for instance issued that phase equality prevails (connection order: U, V, W), in step 121. No instantaneous value of the transverse current 62 may be greater than zero. Only in that case is the criterion IQ<0 met.

If any instantaneous value of the transverse current 62 whatever, within the predeterminable time interval, exceeds the value I=0, then in a further interrogation block 113 it is ascertained whether the phase-related powers $p_U$, $p_V$, $p_W$, ascertained in step 107 are all of them greater than zero. If so, it can be concluded that the phases are cyclically transposed by either +120° or −120°. If that is the case, then in step 115 the course over time of the longitudinal current 64 is evaluated. If one of the instantaneous values of the longitudinal current 64 is positive, this is an indication of a phase shift by +120°. In that case, the supply unit 32 would be cabled as follows: V, W, U. A report accordingly is issued in step 129. The corresponding course over time of the transverse and longitudinal currents is shown in FIG. 4. However, if none of the instantaneous values of the longitudinal current 64 exceeds the value of zero, this means a phase shift by −120°. The connection order in that case is: W, U, V. This corresponds to the course over time of the currents in FIG. 5.

However, if in the interrogation block 113 it is found that at least one of the phase-related powers $p_U$, $p_V$, $p_W$ assumes a positive value, then it is ascertained which one of the phase-related powers $p_U$, $p_V$, $p_W$ is that value. If the power of the phase U is greater than zero, as asked in step 117, this means that the phases V and W are transposed; the connection order is U, V, W. In step 123, a report accordingly is generated. The associated current courses are shown in FIG. 7. However, if the power of phase U is less than zero, then in step 119 it is checked whether the power in phase V is positive. If so, then in step 127 the following report is issued: The phases U and W are transposed with one another. The connection order now looks like this: W, V, U, with the associated current course as in FIG. 6. If the power in phase V is no greater than zero either, then what remains, as the last possible type of fault, is that the phases U and V are transposed. The corresponding fault report is generated in step 125. The phase order is now V, U, W, with the associated current course shown in FIG. 8.

Thus now all the possibilities of transposition of the phase connections of the supply unit 32 are reliably detected. Besides the corresponding displays, still other countermeasures can be initiated, in which for instance the PWM trigger 60 and thus the transistors of the end stage 60 are synchronized with the actual detected network phase order. It is thus possible for the supply unit 40 to be operated with the "wrong phase relationship".

The invention claimed is:

1. A device for monitoring the connection of an electrical supply unit, comprising:
   a voltage detector (32), wherein said voltage detector ascertains phase voltages (14);
   a current detector (32), wherein said current detector ascertains phase currents (38);
   a transformation unit (66), wherein said transformation unit converts the phase currents (36), into at least one transverse current (62) based on a theory of field-oriented regulation, wherein in said field-oriented regulation, detected phase currents are divided into transverse currents and longitudinal currents, wherein the transverse current is perpendicular to the longitudinal current and oriented in the same direction as a network voltage, wherein for monitoring at least one supply connection (28, 36), by way of which an electrical supply unit (32) is supplied, a monitoring device (34) with regulation and control functionality is provided, which evaluates a course of the transverse current (62) for monitoring the connection.

2. The device of claim 1, wherein a faulty connection is found if the transverse current (62) exceeds a predeterminable limit value (I=0).

3. The device of claim 1, wherein the monitoring device (34) for monitoring the connection ascertains a respective phase power (Pu, Pv, Pw) from the phase voltage (14) and phase current (38) and evaluates it.

4. The device of claim 3, wherein the monitoring device (34) compares the phase power (Pu, pv, pw) with a limit value.

5. The device of claim 1, wherein the monitoring device (34) evaluates a longitudinal current (64) for monitoring the connection.

6. The device of claim 1, wherein the course of the phase currents (38) and/or voltages (14) is detected upon activation of a network voltage for a certain time interval.

7. The device of claim 1, wherein in the case of a faulty connection, countermeasures end/or triggering of a display is initiated.

8. The device of claim 1, wherein an intermediate circuit voltage (46) of a direct voltage intermediate circuit is detected for recognizing whether at least one intermediate circuit capacitor (44) is discharged, and in the case of a non-discharging intermediate circuit capacitor (44), an intentional short circuit is brought about via at least one transistor of a power stage (60) of the supply unit (32).

9. The device of claim 1, further comprising a network connection unit (10), wherein voltage detection (32) is performed by the network connection (10) and current detection is performed by the supply unit.

10. The device of claim 1, wherein the transverse current (62) is a component that influences the effective power.

11. A method for monitoring the connection of an electrical supply unit comprising the following steps;
 charging at least one intermediate circuit capacitor (44);
 detecting courses of phase currents (38) and phase voltages (14) for a defined length of time during a charging phase of the intermediate circuit capacitor;
 ascertaining a course of a transverse current (62) and/or longitudinal current (64) from the phase currents (38) and/or the phase voltages (14) by field-oriented regulation, wherein in said field-oriented regulation, detected phase currents are divided into transverse currents and longitudinal currents, wherein the transverse current is perpendicular to the longitudinal current and oriented in the same direction as a network voltage;
 comparing the course of the transverse current (62) and/or longitudinal current (64) with a limit value, wherein a fault of the connection of the supply unit (32) is recognized if the limit value is exceeded or undershot.

12. The method of claim 11, wherein in a further step, from the courses of the phase currents (38) and the phase voltages (14), phase-related powers are ascertained and compared with a limit value, and a fault of the connection of the supply unit (32) is recognized if the limit value is exceeded or undershot.

* * * * *